United States Patent [19]
Cole

[11] 4,196,864
[45] Apr. 8, 1980

[54] LINE WINDING TOOL SET
[76] Inventor: Frederick W. Cole, 623 Fairwinds Dr., Nokomis, Fla. 33555
[21] Appl. No.: 967,269
[22] Filed: Dec. 7, 1978
[51] Int. Cl.² .................... B65H 75/14; B65H 75/30
[52] U.S. Cl. .................... 242/54 R; 242/106;
242/118.6
[58] Field of Search ............ 242/118.4, 118.7, 118.62, 242/118.6, 106, 84.1 A, 54 R, 96, 129.8

[56] References Cited
U.S. PATENT DOCUMENTS

| | | | |
|---|---|---|---|
| 1,316,972 | 9/1919 | Prentiss | 242/118.62 |
| 1,361,250 | 12/1920 | Green | 242/118.62 |
| 2,492,515 | 12/1949 | Beard | 242/106 X |
| 2,760,736 | 8/1956 | Mihalko et al. | 242/84.1 A |
| 2,896,875 | 7/1959 | Reed et al. | 242/84.1 A |
| 2,896,911 | 7/1959 | Carpenter | 242/54 R |
| 3,951,354 | 4/1976 | Bagby | 242/106 |
| 3,973,741 | 8/1976 | Dean | 242/106 |
| 4,007,886 | 2/1977 | Kaminstein | 242/106 |

*Primary Examiner*—George F. Mautz
*Attorney, Agent, or Firm*—Hauke and Patalidis

[57] ABSTRACT

A tool set for replacing the fishing line wound around the spool of a fishing reel consisting of a reel-de-lining tool comprising a shank driven by a power drill and supporting a spool concentric with and constrained to rotate with the shank, the spool having a frusto-conical winding surface and a removable end wall for retrieving old fishing line from a fishing reel and a re-loading tool comprising a support shaft accepting the spool of the fishing reel for power winding a fishing line thereon.

5 Claims, 5 Drawing Figures

LINE WINDING TOOL SET

BACKGROUND OF THE INVENTION

The present invention relates to power winding tools, and more particularly to fishing line winding tools for removing and replacing the fishing line wound around a fishing reel.

Various mechanisms have been designed and marketed in the past for simplifying the task of re-loading fishing reels. For example, U.S. Pat. No. 3,647,155 discloses a manual winding tool built into a tackle box, U.S. Pat. No. 3,951,354 shows another manual loading device, mounted on the fishing rod itself when in use. These previous attempts share the disadvantages of being fairly expensive due to their multitude of parts and of not being power operated since, in some devices, the old line must be manually removed and then the new line manually wound by rotating a crank handle. If power operated, the devices are heavy and complex and must be operated from a fixed position and do not lend themselves to individual use and to purchase by the general public.

It therefore would be useful to have a reel loading and unloading tool which is constructed of very few parts yet is power driven to simplify the re-winding task for the fisherman. It would further be useful to have such a reel loading device made without moving parts that may be easily damaged while in storage, and which may be coupled to an existing motor, such as a commonly available power drill.

SUMMARY OF THE INVENTION

The present invention provides an inexpensive and compact fishing line de-lining and re-loading tool designed to fit a conventional power drill. The reel de-lining tool of the present invention comprises a shank fitting the chuck of a power drill, and a frusto-conical winding spool mounted on the shank and provided with a removable end flange. The re-loading tool of the present invention comprises a shank holding the spool of the fishing reel and driven by a power drill for power winding a fishing line on the spool.

The de-lining and the re-loading rools may be separate tools or alternatively they may be made of the same basic tool, with a few interchangeable elements. In either embodiment, the present invention provides a compact, inexpensive, durable tool which may be easily stored or carried in a tackle box and which, when coupled with a common power hand drill, may be used to rapidly change the fishing line wound on the spool of a fishing reel. For carrying in a tackle box, the hand drill is of course preferably of the cordless battery operated type readily available on the market.

Other objects and advantages of the present invention will become obvious to those skilled in the art when the following description of the preferred embodiments thereof is read in conjunction with the attached drawing wherein like reference numerals refer to like components through the several views and wherein:

DETAILED DESCRIPTION OF THE PREFERRED EMBODIMENTS

Figure 1:
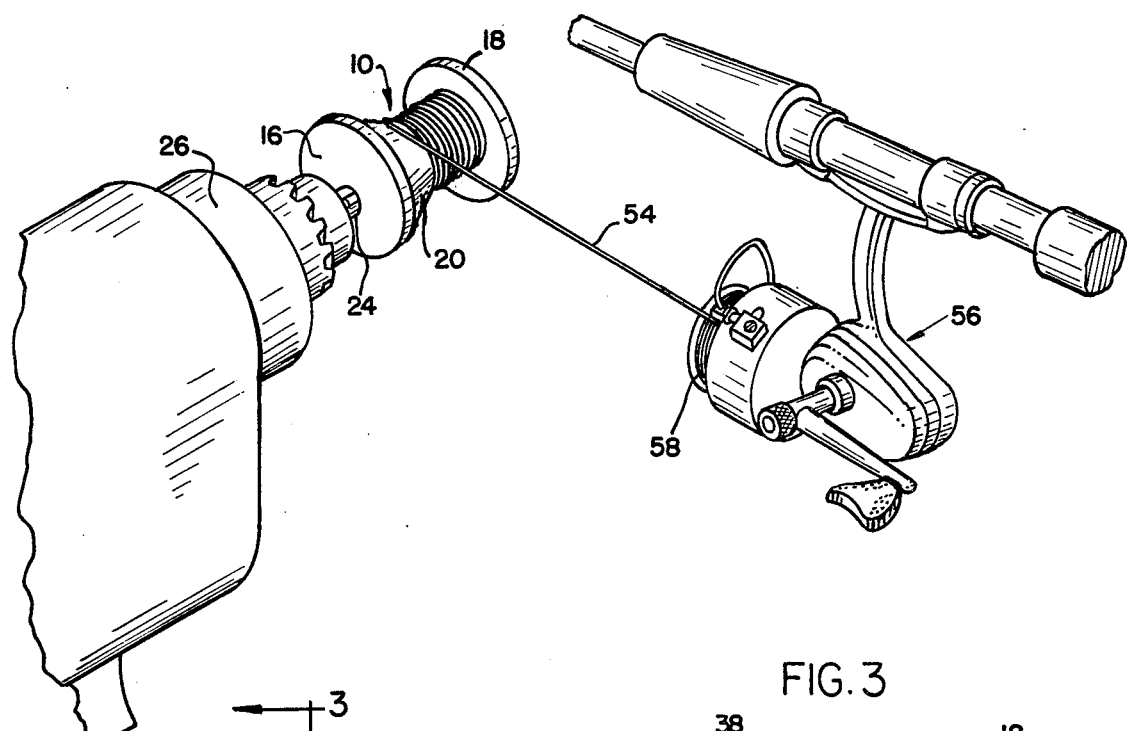
FIG. 1 is a schematic view of a reel de-liner tool according to the invention shown mounted in the chuck of a conventional power drill for drawing fishing line from a fishing reel.

The line winding tool set of the present invention is designed to draw the old line from a fishing reel so as to permit disposal of that line, as shown schematically at FIG. 1, and, by means of a simple modification and a few interchageable elements, to draw replacement line from a storage spool and wind that line around the spool of a fishing reel.

Figure 2:
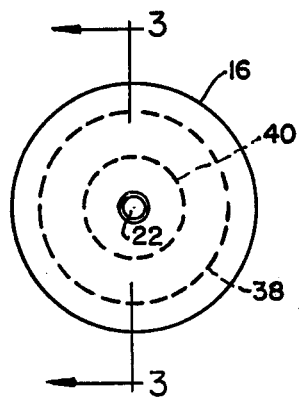
FIG. 2 is an end view of the reel de-liner tool of the present invention.
Figure 3:
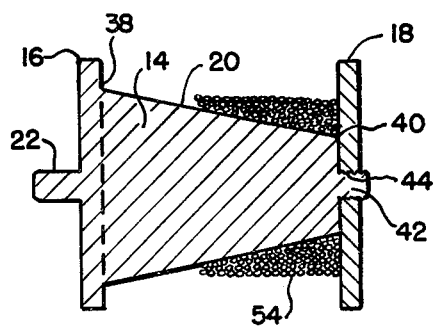
FIGS. 3 and 4 are alternative cross-sectional views thereof taken along line 3—3 of FIG. 2.

Referring now to FIGS. 1–3, an example of reel de-lining tool 10 according to the present invention comprises a take-up spool 14 with two end walls or flanges 16 and 18 defining a line winding surface 20 on the periphery of the spool 14 between the end walls or flanges 16 and 18. Concentric with the spool 14 and on the exterior of the end wall or flange 16 there is mounted a projecting shank 22 designed to fit within the jaws of the chuck 24 of a conventional power drill 26 as shown at FIG. 1. The shank 22 may be circular in section but, preferably, it has a hexagonal cross-section so as to be held securely within the chuck 24 of the power drill 26. In order to fit most conventional hand-held power drills, the shank 22 is preferably ¼" in diameter and at least ½" long. Other sizes, however, may be desirable, for example to fit smaller or larger portable or bench drills.

The take-up spool 14 is preferably frusto-conically shaped, with its larger diameter end 38 proximate the end wall or flange 16 to which the power drill shank 22 is affixed. The other end wall or flange 18, proximate the smaller diameter end 40 of the take-up spool 14, is removably fastened thereto, as shown in FIG. 3, for example, by means of a threaded stud 42 projecting from the end face of the take-up spool 14 and a mating threaded bore 44 in or through the end wall or flange 18.

The reel de-lining tool 10 may be constructed, for example, of two molded metal alloy or plastic components, one forming the removable end wall or flange 18 and the second comprising the spool 14, the end wall or flange 16, the threaded stud 42, and the shank 22 all integrally molded in a single piece.

Figure 4:
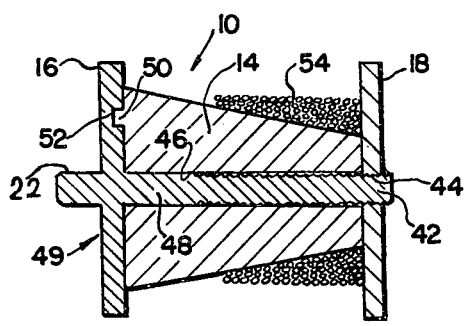

Alternatively, and preferably, the reel de-lining tool 10 may be made of three simple component parts, as shown in FIG. 4. In this embodiment, the take-up spool 14 is a separate molded or cast member of a frusto-conical external shape provided with a centrally disposed internal bore 46 accepting a long threaded shaft 48. The shaft 48 is welded to or formed integral with the end wall or flange 16 and the drive shank 22, thus forming a basic integral assembly 49. At least one keyhole 50 may be formed in the end wall accepting a key or pin 52 protruding from the end face of the take-up spool 14 to constrain the spool to rotate in unison with the end wall or flange 16 and thus cause it to be driven by the shank 22. The removable end wall or flange 18, defining the third component, fastens the assembly together by threading, via its threaded bore 44, on the end of threaded shaft 48. Keyhole 50 and key or pin 52 are not essential as long as there is sufficient friction between the surfaces of the end faces of the take-up spool 14 and end walls or flanges 16 and 18.

As shown in FIG. 1, the de-liner tool 10 is, in use, mounted in the chuck 24 of a conventional power drill 26. The free end of a fishing line 54 which is to be removed from a fishing reel 56 is fastened to the take-up spool 14, either by knotting one turn of line around the winding surface 20 or, by trapping the free end of the line between the surfaces of the threaded bore 44 in the end wall or flange 18 and the threaded stud 42. The power drill 26 is then turned on, drawing the line from the spool 58 of the fishing reel 56. When all of the line 54 has been removed from the fishing reel 56, it is easily disposed of by removing the end flange 18 from the tool and sliding the line off the winding surface 20. This is made especially easy by the frusto-conical shape of the take-up spool 14 since the diameter of the spool decreases and thus the line becomes looser as it is slid off the small diameter end 40 of the spool.

Figure 5:
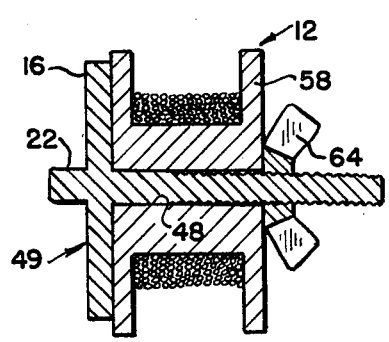
FIG. 5 is a cross-sectional view similar to FIG. 4, but showing a reel re-loading tool according to the present invention.

The line re-loading tool 12 of the present invention, shown in cross-section at FIG. 5, is used to take a line from a storage spool and wind it around a working spool, such as the spool 58 of the fishing reel 56 of FIG. 1. As shown in FIG. 5, the re-loading tool 12 comprises the same threaded shaft 48 affixed to or integral with the end wall or flange 16, as described relative to the de-liner tool 10 of FIG. 4. The end wall or flange 16 is provided with a power drill shank 22. The empty fishing reel spool 58 is mounted on the shaft 48 and is secured thereto, for example by a wing nut 64, although it will be appreciated that the removable end flange 18 of FIG. 3 may also be used for the purpose of clamping the reel 58 on the shaft 48.

It is to be noted that the shaft 48, the end wall or flange 18, and the power drill shank 22 form an integral basic assembly 49 identical to the integral basic assembly 49 of the re-lining tool 10 shown at FIG. 4. A kit may therefore be constructed consisting of the basic assembly or unit 49, the removable end wall or flange 18, the frusto-conical spool 14, and if desired, the wing nut 64. Alternatively, the re-loading and de-lining devices may be sold separately, using the simple de-lining tool of FIG. 3. When using the basic or assembly or unit 49 as a reel re-loading device, sleeves of various wall thicknesses to accommodate differences in sizes of reel mounting bores may be used (not shown), slipped on the shaft 48 to properly center the reel 58.

Having thus described the present invention by means of a detailed description of the preferred embodiments thereof, variations whereof will be apparent to those skilled in the art, what is claimed as novel is as follows:

1. A line winding tool for removing a line wound on a fishing reel spool comprising a take-up spool, a pair of end flanges each at one end of said spool, a drive shank concentric with said take-up spool mounted to the first of said flanges, said drive shank being adapted for removable mounting in the chuck of a power drill, wherein said take-up spool is frusto-conical in shape and has its end of larger diameter disposed proximate the first of said flanges and the second of said flanges is removably attached to said spool at its end of smaller diameter, and wherein said shank, the first of said flanges and said spool are formed integrally as a single component.

2. The line winding tool of claim 1 wherein the second of said flanges is secured to said spool by means of a threaded bore in the center of said second of said flanges threading on the end of a threaded stud projecting from the corresponding end of said spool.

3. A line winding tool for removing a line wound on a fishing reel spool, said tool comprising a drive shank, a flange attached to said shank, a threaded shaft concentric with said shank and projecting from said flange, a take-up spool having a longitudinal bore accepting said shaft, said take-up spool being removably mounted on said shaft, an end flange threading on the end of said shaft and holding said take-up spool in position on said shaft, and mating recess and projection in one of said flanges and in said take-up spool constraining said take-up spool to rotate with said shank.

4. The line winding tool of claim 3 wherein said take-up spool is frusto-conical in shape.

5. The line winding tool of claim 3 wherein said take-up spool is a conventional fishing reel spool.

* * * * *